April 11, 1939.  B. KAHN  2,154,402
RADIAL ENGINE STRUCTURE
Filed Jan. 15, 1935  4 Sheets-Sheet 1

INVENTOR
Benjamin Kahn

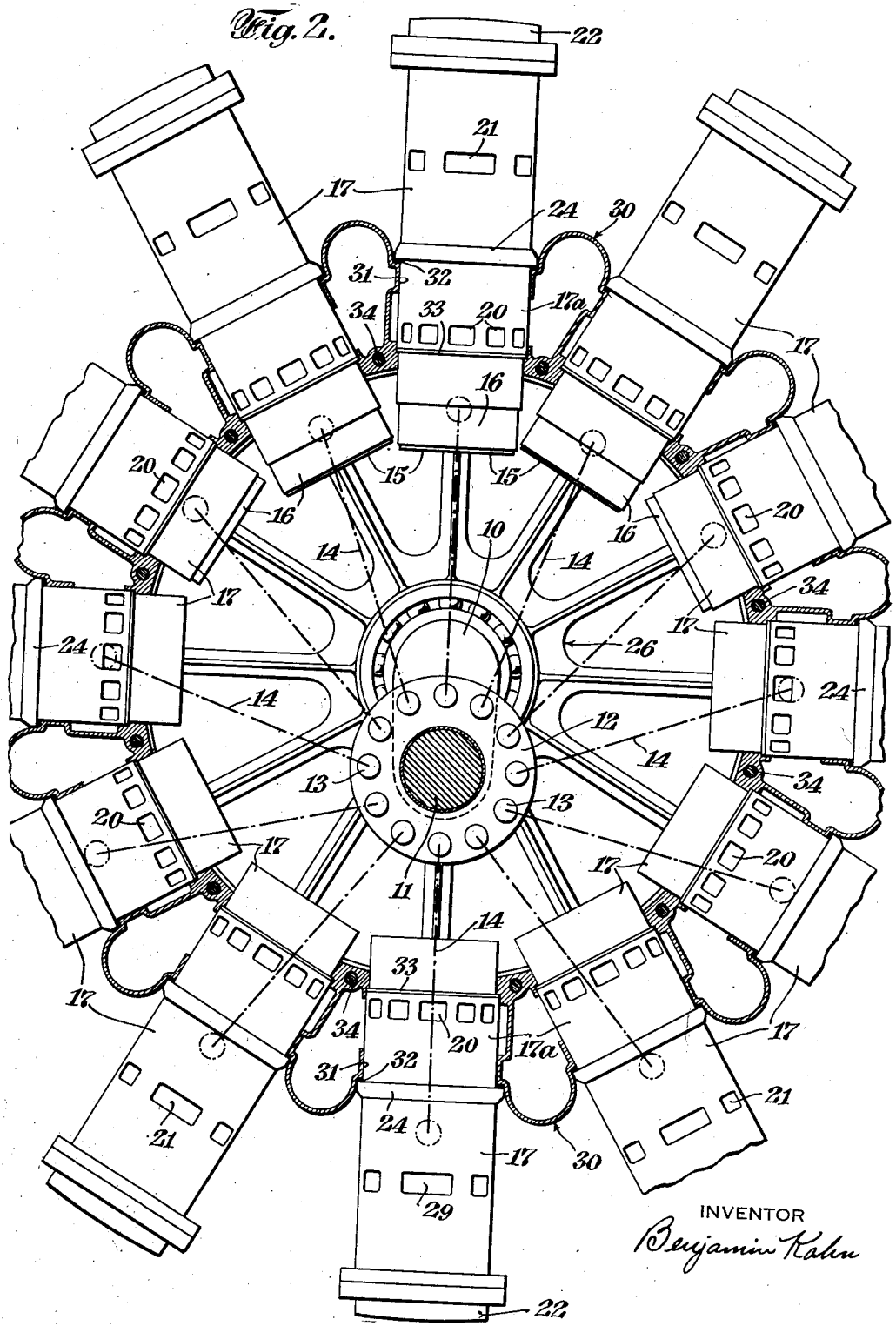

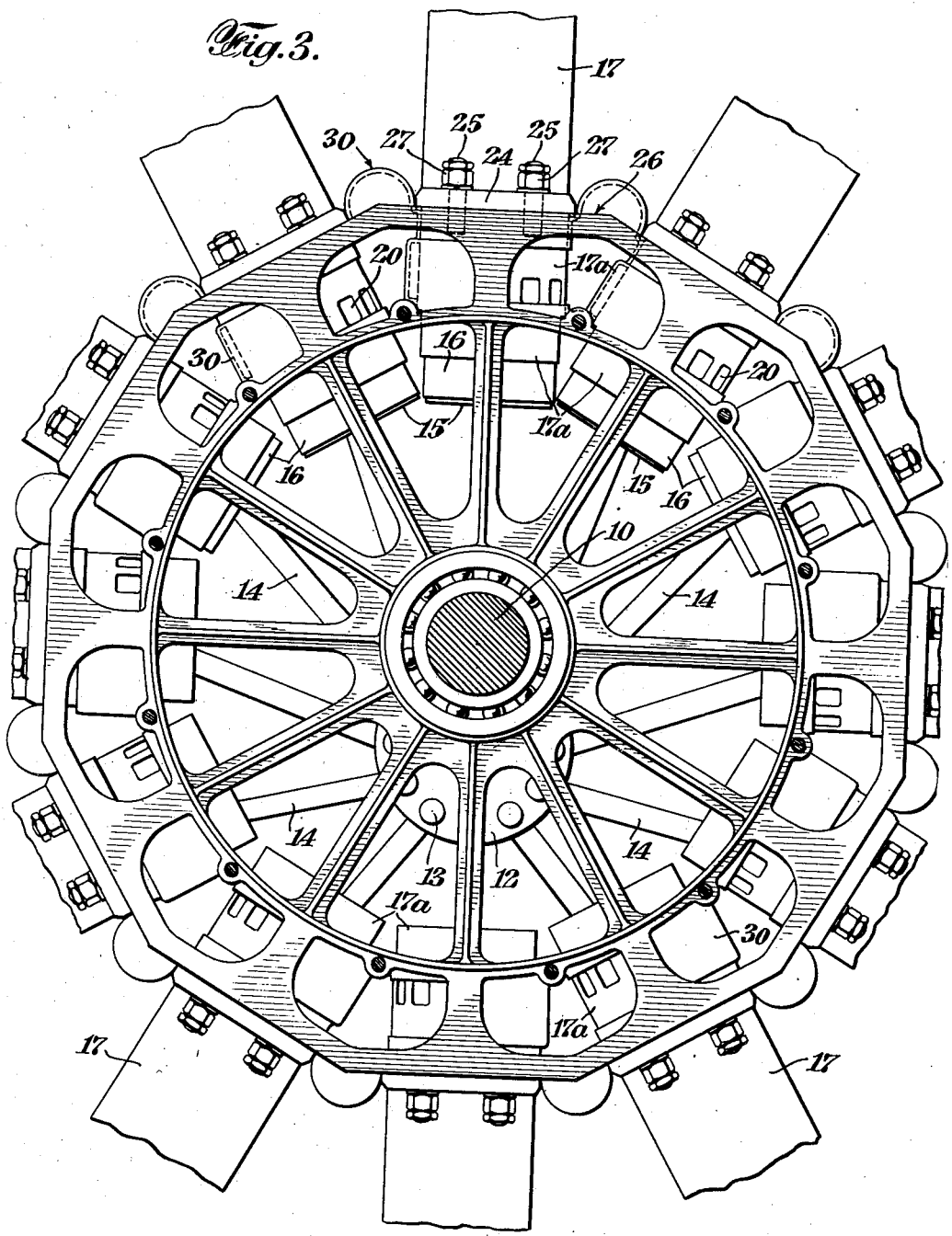

April 11, 1939.  B. KAHN  2,154,402
RADIAL ENGINE STRUCTURE
Filed Jan. 15, 1935  4 Sheets-Sheet 4
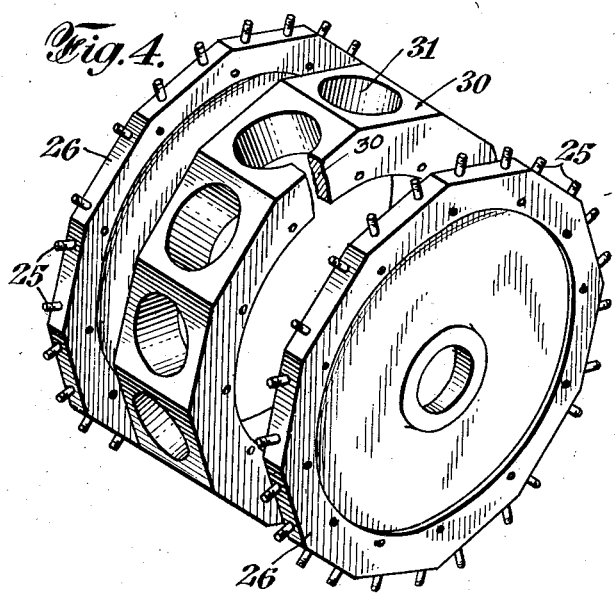
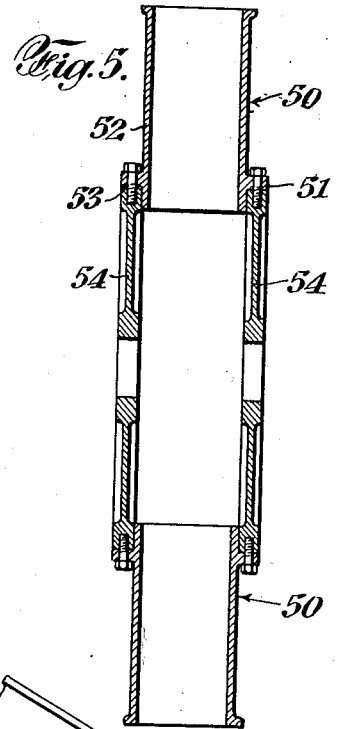
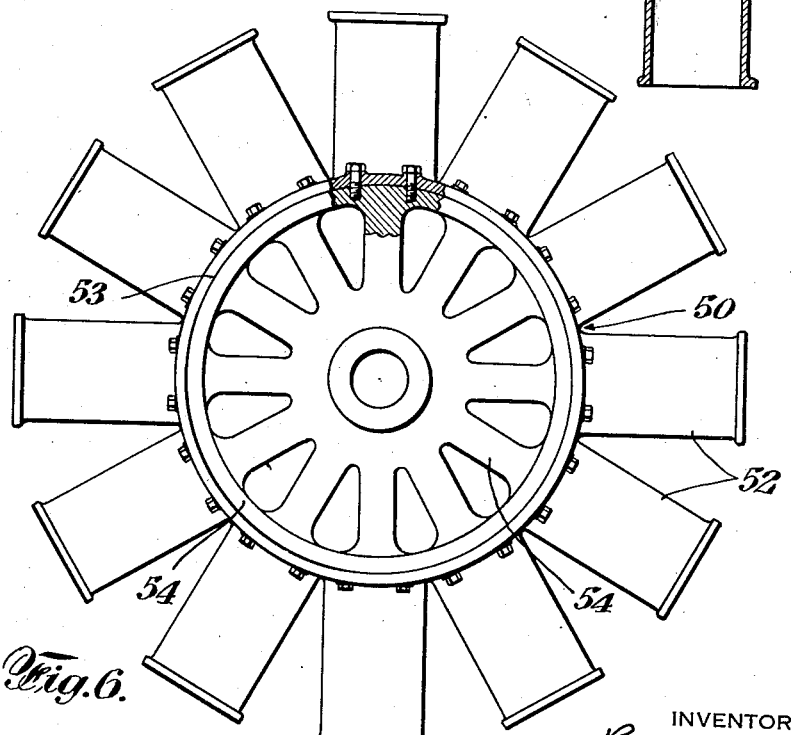
INVENTOR
Benjamin Kahn Patented Apr. 11, 1939

2,154,402

UNITED STATES PATENT OFFICE 2,154,402

RADIAL ENGINE STRUCTURE

Benjamin Kahn, New York, N. Y., assignor to Kinetic Cycle Research Corporation, New York, N. Y., a corporation of New York Application January 15, 1935, Serial No. 1,841

29 Claims. (Cl. 121—194)

This invention relates to improvements in crankcase construction for radial internal combustion engines and particularly to improvements in cylinder and crankshaft-mounting structures.

The main object of the invention is to provide a strong and light-weight structure for better receiving the high compression and expansion loads originating in the cylinders and tending to flex the parts subject to and reacting to such loads.

Another object is to provide a light weight, combined cylinder and crankshaft supporting structure wherein distortions and other unavoidable disadvantageous events of explosion loads and temperature expansion of the parts are most effectively accommodated.

Another object is to provide means whereby the explosion loads are taken in tension only in strong, light-weight discs disposed between the cylinders and the crankshaft.

Another object is to provide a radial engine having a cylinder mono-block with radially disposed cylinders secured to crankshaft supporting and load transmitting discs.

Another object is to provide a radial engine of such structure wherein a crankcase member is provided as a sealing means which is free to expand and contract radially irrespective of the radial expansion or contraction of the cylinders and the discs.

Other objects and advantages will become apparent in the following description having reference to the accompanying drawings, wherein:

Figure 2 is a section taken substantially on the line 2—2 of Figure 1 with some of the parts shown in elevation.

Figure 3 is a view taken substantially on the line 3—3 of Figure 1 with certain parts removed.

Figure 4 is a simplified expanded detail perspective of some of the parts with certain parts omitted.

Figure 5 is a longitudinal section schematically illustrating another form of the invention.

Figure 6 is a schematic elevation of the form shown in Figure 5 with some parts shown in section.

Figure 1:
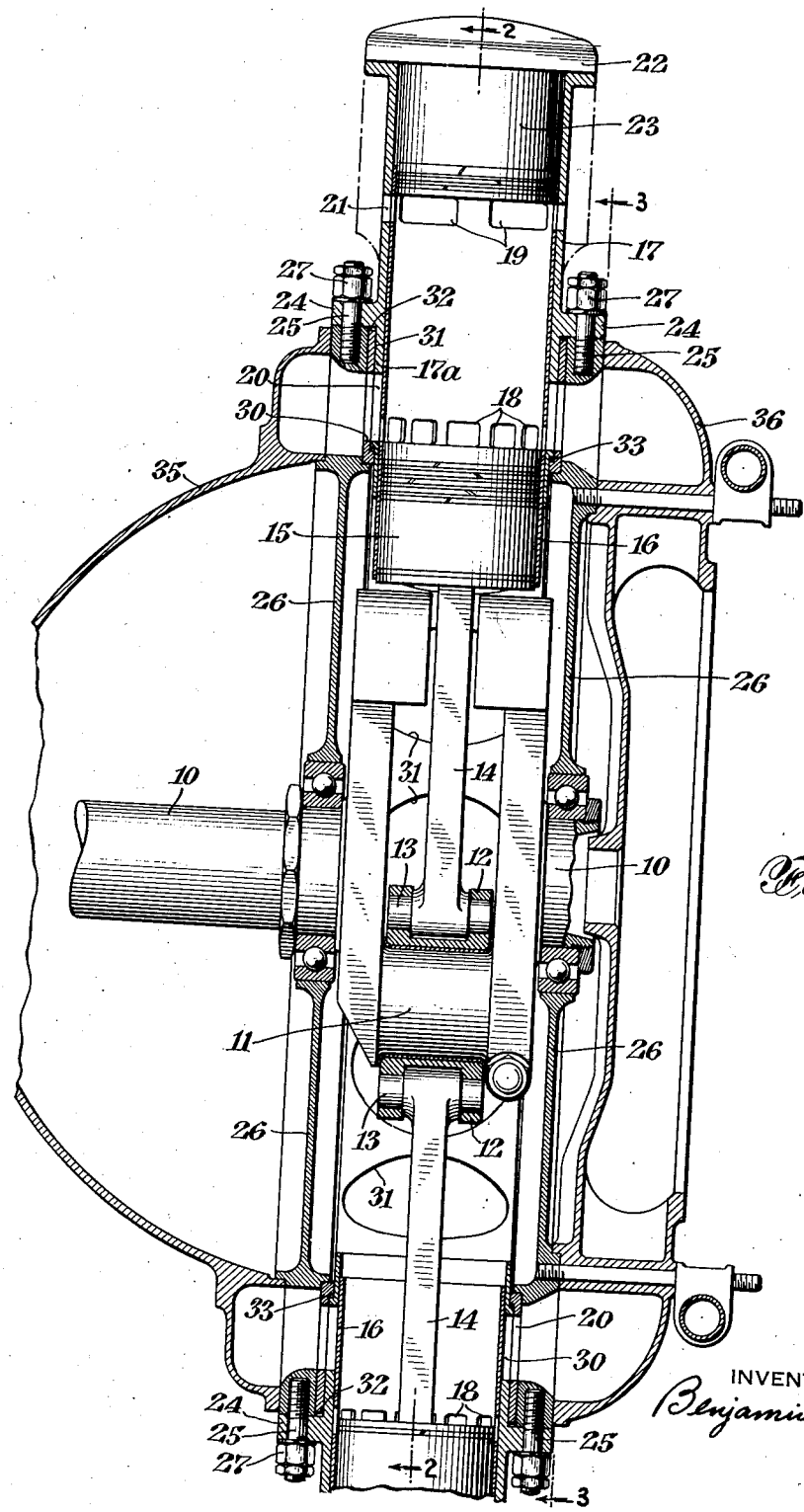
Figure 1 is a longitudinal section of a radial engine with some parts shown in elevation and other parts broken away.

The reference character 10 indicates a crankshaft of a radial engine having a crankpin 11. On the crankpin is a bearing 12 which may be part of a master connecting rod (not shown). This bearing member is adapted to receive knuckle pins 13 which secure the inner ends of connecting rods 14 to the crankpin bearing member. These connecting rods carry pistons 15 in the usual manner. The pistons 15 are adapted to reciprocate in sleeves 16 which in turn operate in cylinders 17. The operating means for the sleeves are here not shown as it forms no important part of this disclosure.

Intake and exhaust ports 18 and 19 respectively are provided in the sleeve which cooperate in the usual manner with intake and exhaust ports 20 and 21 respectively in the cylinder. Although in this embodiment of the invention the ports in the sleeve and cylinder are shown at opposite ends thereof, it is understood that in other forms of scavenging, such as loop scavenging well-known in the art, may be employed with efficiency as far as this invention is concerned. Loop scavenging is had where both the intake and exhaust ports are at the same end of the cylinder. These ports may be at the upper or lower end. It is also to be understood that sleeves are not absolutely essential to the practice of this invention as it applies to engine structures with any type of port controlling mechanism.

On the outer end of the cylinder 17 is suitably secured a head 22 having an inreaching portion 23 cooperative with the sleeve in the usual manner.

The cylinder 17 is provided with flanges 24 having suitable holes therein to receive cylinder hold-down studs 25. The studs 25 are anchored in the periphery of discs 26. These discs are disposed on either side of the crankpin. By means of nuts 27 on the studs 25, the cylinders are secured directly to the discs. The discs are adapted to support the crankshaft at their centers.

Sandwiched between the discs is a crankcase member 30 having bores 31 to receive inreaching portions 17a of cylinders 17. Gaskets 32 and 33 are provided between the crankcase member and the cylinders.

Tie bolts 34 may be provided to hold the discs 26 and crankcase member in sandwiched relationship. The tie bolts may be used to secure front housing 35 and rear housing 36 to the discs.

By this construction it will be noted that the crankshaft bearing discs are disposed in a plane which includes the crankshaft bearings and the cylinder studs. All explosion loads in the cylinder are therefor transmitted in the plane in straight lines normal to the crankshaft bearings. The crankcase member 30 takes no explosion loads and may therefore be made of a light-weight alloy, whereas the load carrying discs which receive loads in tension only, may be made of steel, which is one of the lightest materials for tensional stress application.

The gaskets 32 and 33 allow for any difference of radial expansion between the crankcase member and the discs, which is the condition, when the crankcase is made of a light-weight alloy and the discs of steel. Suitable clearance is provided around the tie bolts 34 to allow for independent relative movement of the parts. The contact between the cylinder and the crankcase member 30 prevents any leakage of oil. The gaskets serve as additional oil seal and may be omitted but in such a case expansion gaps at these points should be provided to allow for expansion of the crankcase member 30 without restriction by contact with the cylinders.

It will be noted that the crankcase member 30 is of a single piece and may be cast with thin walls and may be of any complicated shape. Machining and finishing this casting is simple due to its being of one integral piece. The load receiving discs may be forged, and due to their simplicity proper grain flow can easily be obtained. This composite engine structure is especially advantageous if the engine is to operate on the Diesel cycle where provision must be made for resisting extremely high loads, and where the engine must be of light-weight to be suitable for aviation use. Substantial portions of the disc web may be holes or openings to lighten the structure without impairing the load reacting strength of the web or disc. The inlet passages in the discs 26 are not essential. If desired the discs may be made smaller across the flats thereof. The cylinder flanges as well as the holddown studs may then be below the intake ports 20. It will also be seen that the crankcase member 30 takes no explosion loads but merely acts as an oil seal because of its peripheral continuity thereby coacting with and closing off the spaces between the separate cylinders.

In a construction where the cylinders are not separate members but are integrally formed such as in a cylinder mono-block, the crankcase member 30 may be entirely omitted as illustrated in Figures 5 and 6.

Figures 5 and 6 show the application of the invention in a cylinder mono-block construction, where the cylinders are integrally formed in a single block. In this case the block 50 provides an integral annular flange 51 forming the root of the radially disposed cylinders 52. This block is bored at the inner periphery of the flange 51 as at 53 to receive close fitting circular crankshaft bearing discs 54 in this bore, for the reception and attachment to the cylinder mono-block flange. In this case, where the base of the cylinders are integral in the continuous annular flange, no separate crankcase section between the discs is necessary. Whereas in the previous form the discs and cylinders may be made of materials having dissimilar coefficients of expansion, these parts in the construction shown in Figures 5 and 6 should preferably be made of materials having substantially the same coefficient of expansion.

In engines of cylinder mono-block construction where the heat conditions are such that relatively small or little increase of the diameter of the discs and mono-block flange occurs during expansion, the discs may be made of material having slightly different coefficients of expansion than that of the cylinder mono-block. Any tendency of the parts to separate in their fully expanded or contracted condition may be overcome by tensioned and preloaded bolts which maintain contact between the engageable surfaces of the discs and flanges, providing however, the load or strength limits of the parts are not exceeded thereby avoiding rupture of any of the parts or the bolts.

Having thus described the principles of the invention as applied to two operative embodiments thereof, it will be seen that the invention may have other modifications without departing from the principles of this disclosure as defined in the claims.

What is desired to be claimed is:

1. An internal combustion engine crankcase structure including, spaced crankshaft bearing discs, and separate cylinders mounted on and secured to the discs, whereby said discs are held in spaced relation by said cylinders.

2. An internal combustion engine crankcase structure including spaced and substantially flat crankshaft bearing discs, separate cylinders mounted on and secured to the discs, and a member between the discs having sealing engagement with the cylinders.

3. An internal combustion engine crankcase structure including spaced and substantially flat crankshaft bearing discs, separate cylinders mounted on and secured to the discs, a sealing member between the discs, and means whereby the member is free to expand or contract independently of the discs.

4. An internal combustion engine crankcase structure including spaced and substantially flat crankshaft bearing discs, separate cylinders mounted on and secured to the discs and disposed radially therearound, and sealing means for closing the spaces between the cylinders.

5. An internal combustion engine crankcase structure including a crankshaft, discs for bearing the crankshaft, separate cylinders mounted on and secured to periphery of the discs, and an oil sealing member freely expandible between the discs.

6. An internal combustion engine crankcase structure including a crankshaft, discs for supporting the crankshaft, cylinders mounted on the periphery of the discs, and means between the discs and the cylinders for enclosing the space between the discs at the peripheries thereof.

7. An internal combustion engine crankcase structure including spaced crankshaft bearing discs, separate cylinders having flanges mounted on the edges of the discs, and a freely expandible spacer member disposed substantially within the projected confines of said discs, said member being substantially tubular and having its opposite end faces engageable with facing surfaces of said discs.

8. An internal combustion engine crankcase structure including crankshaft bearing discs, separate cylinders mounted on and secured to the discs at the edges thereof, and oil sealing means for the spaces between the separate cylinders.

9. A radial engine crankcase structure including substantially flat crankshaft bearing discs separated from each other and providing peripheral edges substantially in the plane thereof, cylinders having a flanged portion near their inner ends, and substantially radially disposed bolts anchored in the discs for securing the flanged portions of the cylinders to the peripheral edges of the discs.

10. A radial engine crankcase structure including circular crankshaft bearing discs, and a radial cylinder mono-block mounted on and secured directly to the discs.

11. An internal combustion engine crankcase structure including a crankshaft, discs having bearings for the crankshaft, separate cylinders mounted on the edges of the discs, means in the plane of the discs for securing the cylinders to the discs.

12. An internal combustion engine crankcase structure including crankshaft bearing discs, cylinders mounted on and secured to the peripheral edge of the discs by radially disposed means in tension.

13. A radial engine crankcase structure including crankshaft bearing discs, cylinders, and flanged portions on the cylinders mounted on and secured to the discs by radially disposed means in tension.

14. A radial engine crankcase structure including crankshaft bearing discs, cylinders, flanged portions on the cylinders mounted on the discs, and means anchored in the discs and shouldered on the flanged portions for securing the cylinders to the discs.

15. An engine crankcase structure including circular crankshaft bearing discs, a cylinder mono-block, and a flange on said mono-block adapted to embrace the discs.

16. An engine crankcase structure including circular crankshaft bearing discs, a cylinder mono-block, and a flange on said mono-block, said flange being mounted on and secured to the discs.

17. A crankcase structure for radial internal combustion engines having a plurality of cylinders each provided with a flange, a substantially flat disc providing seats for said flanges and also providing a bearing for the crankshaft in its center, said seats being in the peripheral edge of the disc, and means in the peripheral edge of the disc for securing said flanges to the disc.

18. In a radial cylinder combustion engine, a crankcase structure including a plurality of cylinders having flanges, substantially flat discs spaced apart and having crankshaft bearings in axial alinement and in the center of each of said discs, said discs having seats for supporting engagement with the flanges of the cylinders, said discs being arranged one on each side of the common plane of the cylinders, said seats comprising the peripheral edges of the discs, and means in the plane of the discs for securing said flanges to said discs.

19. A radial internal combustion engine crankcase structure including flat crankshaft bearing discs, a plurality of cylinders provided with outwardly directed flanged means, each of said discs having a peripheral edge providing a cylinder seat in the plane of the flanged means and adapted to cooperate with respective portions of said seat, and means anchored in the peripheral edge of the discs for securing said flanged means to said seats.

20. A radial internal combustion engine cylinder supporting structure including a flat crankshaft bearing disc having a peripheral edge providing a cylinder seat in the plane of the disc, a plurality of cylinders provided with outwardly directed flanged means adapted to sit on said seat, and means anchored in the peripheral edge of the disc for securing said flanged means to said seat.

21. A radial engine crankcase structure including substantially flat crankshaft bearing discs separated from each other, each of said discs providing a cylinder seat on its peripheral edge, cylinders having flanged portions near their inner ends and adapted to sit on said seats, and substantially radially disposed bolts anchored in the discs for securing the cylinders to the discs whereby the flanged portions of the cylinders are urged against said peripheral edge of the discs.

22. In a radial internal combustion engine the combination of substantially flat crankshaft bearing discs separated from each other, each having a peripheral edge substantially in the plane thereof providing a cylinder seat, cylinders having a flanged portion near their inner ends, and substantially radially disposed bolts anchored in the discs and shouldered on the flanged portion of the cylinders for securing the cylinders to the peripheral edges of the discs.

23. A crankcase structure for internal combustion engines including substantially flat crankshaft bearing discs each having an arcuate peripheral edge substantially in the plane thereof providing a cylinder seat, a cylinder mono-block comprising at least two cylinders and a flange integrally formed therewith, said flange having arcuate surfaces corresponding to said arcuate peripheral edges of said discs and adapted to sit on said edges, and means for securing said mono-block to said discs.

24. In an internal combustion engine, the combination of substantially flat crankshaft bearing discs each having an arcuate peripheral edge substantially in the plane thereof providing a cylinder seat, a cylinder mono-block comprising at least two radially disposed cylinders and a flange integrally formed therewith, said flange having arcuate surfaces corresponding to the said arcuate peripheral edges of said discs and adapted to sit on said edges, and means for securing said mono-block to said discs.

25. An internal combustion engine crankcase structure including spaced crankshaft bearing discs each providing a seating surface on its edge, separate cylinders each provided with flanges mounted on said discs and having surfaces engaging said seating surfaces of said discs, means for holding said flanges in engagement with said discs, and a spacer member disposed substantially between said discs, said member having only oil-sealing engagement with facing surfaces of said discs and only oil-sealing engagement with said cylinders.

26. An internal combustion engine crankcase structure including spaced crankshaft bearing discs each providing a seating surface on its edge, separate cylinders each provided with flanges mounted on said discs and having surfaces engaging said seating surfaces of said discs, means for holding said flanges in engagement with said discs, a spacer member disposed substantially between said discs, said member having only oil-sealing engagement with said discs, and yieldable means between said spacer member and said flanges.

27. An internal combustion engine crankcase structure including spaced crankshaft-bearing discs each providing a seating surface on its edge, separate cylinders each provided with flanges mounted on said discs and having surfaces adapted to engage said seating surfaces, means for holding said flanges in engagement with said discs, said cylinders extending inward of said flanges, and a member having only oil-sealing engagement with said inwardly extending portion of said cylinders and only oil-sealing engagement with facing surfaces of said spaced discs.

28. A radial engine crankcase structure including radially disposed cylinders having integral flanges, spaced crankshaft-bearing discs each providing a seating surface on its edge, said flanges mounted on said discs and having surfaces engaging said seating surfaces, and bolts engaging said flanges and said discs for holding said flanges on the edges of said discs, said bolts being disposed substantially parallel to the axis of their adjacent cylinders.

29. An internal combustion engine crankcase structure including a crankshaft bearing disc having a seating surfaces on its edge, cylinders having an integral flange means mounted on said disc, and means in tension for holding only said flange means in compression against the edge of said disc, said flange means being engageable by said seating surface, whereby the position of said disc is maintained.

BENJAMIN KAHN.